(12) United States Patent
Gudmundsson

(10) Patent No.: US 10,390,652 B2
(45) Date of Patent: Aug. 27, 2019

(54) MULTIPLE DOSING DEVICE AND MAGAZINE

(71) Applicant: Ekberg Emballage AB, S-Vellinge (SE)

(72) Inventor: Jonas Gudmundsson, Hollviken (SE)

(73) Assignee: EKBERG EMBALLAGE AB, S-Vellinge (SE)

( * ) Notice: Subject to any disclaimer, the term of this patent is extended or adjusted under 35 U.S.C. 154(b) by 0 days.

(21) Appl. No.: 15/547,366

(22) PCT Filed: Sep. 29, 2015

(86) PCT No.: PCT/SE2015/051026
§ 371 (c)(1),
(2) Date: Jul. 28, 2017

(87) PCT Pub. No.: WO2016/122366
PCT Pub. Date: Aug. 4, 2016

(65) Prior Publication Data
US 2017/0360241 A1    Dec. 21, 2017

(30) Foreign Application Priority Data
Jan. 30, 2015   (SE) ...................................... 1550092

(51) Int. Cl.
*A47J 31/40*   (2006.01)
*A47J 31/36*   (2006.01)
(Continued)

(52) U.S. Cl.
CPC ............. *A47J 31/401* (2013.01); *A47J 31/36* (2013.01); *A47J 31/3642* (2013.01);
(Continued)

(58) Field of Classification Search
CPC .... A47J 31/36; A47J 31/3623; A47J 31/3642; A47J 31/404; A47J 31/407; A47J 31/401; A47J 31/44
See application file for complete search history.

(56) References Cited

U.S. PATENT DOCUMENTS

| 4,785,931 A | 11/1988 | Weir et al. |
| 6,609,612 B2 | 8/2003 | Vlodek |

(Continued)

FOREIGN PATENT DOCUMENTS

| EP | 1500358 A1 | 1/2005 |
| EP | 2123201 A1 | 11/2009 |
| EP | 2311748 A1 | 4/2011 |

OTHER PUBLICATIONS

International Search Report for PCT/SE2015/051026.
(Continued)

*Primary Examiner* — J C Jacyna
(74) *Attorney, Agent, or Firm* — Fishman Stewart PLLC

(57) ABSTRACT

The present disclosure concerns a multiple dosing device and magazine for releasing one or more doses of additive. The multiple dosing device comprises a magazine having a number of through openings, each receiving a tube, containing a dose of additive. The through openings and tubes extended axially between two opposite ends of the magazine. The tubes are arranged moveable in an axial direction inside respective through opening. Each tube has a pointed lower end. An upper foil and a lower foil are placed adhered to the opposite ends of the magazine. The ends of the tubes are placed abutting or adjacent the upper and lower foils, respectively. The multiple dosing device further comprises an activation part with push buttons, which push buttons are placed for controlling the axial position of one tube each.

20 Claims, 4 Drawing Sheets

(51) Int. Cl.
*A47J 31/44* (2006.01)
*B65D 81/32* (2006.01)
*B65D 83/00* (2006.01)

(52) U.S. Cl.
CPC .......... *A47J 31/404* (2013.01); *A47J 31/407* (2013.01); *A47J 31/44* (2013.01); *B65D 81/3211* (2013.01); *B65D 83/0005* (2013.01)

(56) References Cited

U.S. PATENT DOCUMENTS

| | | | |
|---|---|---|---|
| 6,976,578 B1* | 12/2005 | Kenihan | B65D 51/2835 |
| | | | 206/219 |
| 8,408,389 B1 | 4/2013 | Anderson | |
| 8,684,231 B2* | 4/2014 | Lane | B65D 47/08 |
| | | | 206/219 |
| 2010/0163509 A1 | 7/2010 | Canziani Hoffa et al. | |
| 2013/0011521 A1* | 1/2013 | Weijers | A47J 31/36 |
| | | | 426/87 |
| 2015/0238043 A1* | 8/2015 | Agon | A47J 31/3642 |
| | | | 99/295 |
| 2016/0236842 A1* | 8/2016 | Scrivani | B65D 77/003 |

OTHER PUBLICATIONS

Decision to Grant a Patent (Russia); Application No. 2017130715/12 (053484).
Extended European Search Report; Application No. 15880333.8-1016/3250089—PCT/SE2015051026.
European Search Report Reference E71720004LK; Application No. PCT/SE2015051026.

\* cited by examiner

MULTIPLE DOSING DEVICE AND MAGAZINE

CROSS-REFERENCE TO RELATED APPLICATIONS

This application claims priority to International Patent Application No. PCT/SE2015/051026, filed on Sep. 29, 2015, and Swedish Patent Application No. 1550092-9, filed on Jan. 30, 2015, the contents of both of which are incorporated by reference in their entireties.

TECHNICAL FIELD

The present invention concerns a multiple dosing device and magazine, to be used for mixing additives with a fluid.

BACKGROUND

The multiple dosing device has been developed for milk powder, especially baby formula milk powder, but it could be used for other powder-like additives or pellet-like additives such as coffee, tea, chocolate, medicine, vitamins etc. to be mixed with a fluid. Thus, the invention is generally directed to a device for mixing an additive with a fluid before drinking.

For many additives it is important that the additive is held in a sealed condition before use. If the additive gets wet before use it may not be useable.

Today it is common to take for instance baby formula milk powder from a can in a measured quantity. Said measurement is often made by hand and can be quite cumbersome and is not always accurate. Further, the baby formula milk powder left in the can risk deteriorating due to exposure to the surrounding air.

SUMMARY

In view of the above, one object of the present invention is to facilitate measuring and delivering of exact quantities of additive at the same time as deteriorating of not yet used additive is hindered.

According to one aspect of the invention, a multiple dosing device is provided for releasing one or more doses of powder or additive. The device comprises a magazine, having a number of through openings receiving a tube each. The tubes contain a dose of additive each. The through openings and the tubes extended axially between two opposite ends of the magazine. The tubes are arranged moveable in an axial direction inside respective through opening. The device further comprises an activation part having push buttons. The push buttons are placed for controlling the axial position of one tube each.

A further aspect of the present invention is that the same type of magazine should be possible to use for many different additives, irrespectively of their consistency. By having only one, or a few, types of magazine handling of the magazines are facilitated. This refers to manufacture, filling etc.

Even though the invention is mainly described in connection with milk powder, a person skilled in the art realises that it may be used for other additives to be mixed with a fluid before consumption.

In one embodiment the magazine is placed in an automatic brewer, such as a coffee making machine adapted to receive the magazine. The strength of the coffee may be adjusted by the number of tubes chosen for release of the coffee.

Further objects and advantages of the present invention will be obvious to a person skilled in the art when reading the detailed description below.

BRIEF DESCRIPTION OF THE DRAWINGS

The invention will be explained further below by way of example and with reference to the enclosed drawings. In the drawings.

DETAILED DESCRIPTION

Figure 1:
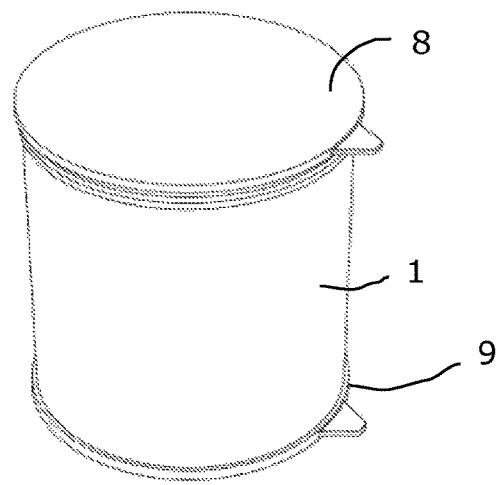
FIG. 1 is a perspective view of a magazine according to the present invention.
Figure 2:
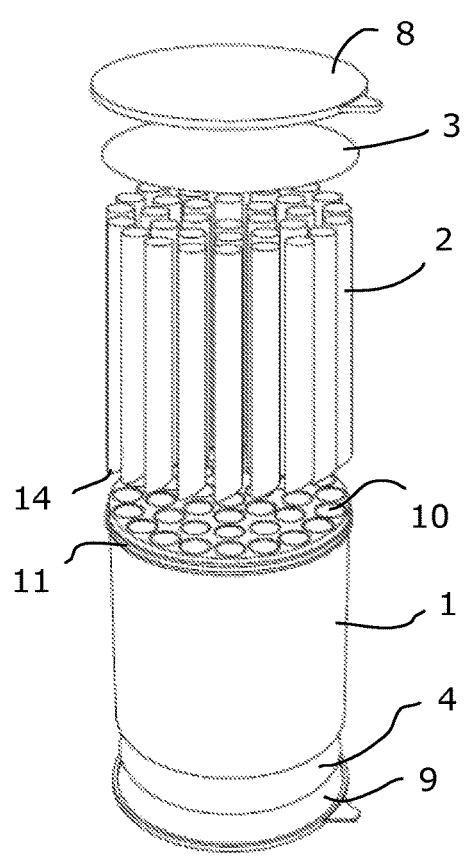
FIG. 2 is an exploded view of the magazine of FIG. 1.

As used in this description the expressions "upper", "lower", "axial", "radial" and corresponding expressions are in relation to the device as shown in respective Fig. and the position of the device in normal use.

The multiple dosing device has a magazine 1, receiving a number of tubes 2 open at both ends, and an activation part 5, placed on one side of the magazine 1.

The magazine 1 has the form of a cylinder and has a number of through openings 10. The through openings 10 extend in axial direction between opposite ends of the magazine 1. An upper foil 3 and a lower foil 4 are placed at opposite ends of the magazine 1, covering both ends of each through opening 10.

A tube 2 is placed in each through opening 10. The tubes 2 are arranged moveable in an axial direction inside respective through opening 10 receiving a tube 2. Each tube 2 is moveable between a non-activated, upper position and an activated, lower position. Each tube 2 has a pointed lower end 14. The pointed lower end 14 is given in that the lower end is inclined from one side of the tube to the diametrically opposite side of the tube 2. The ends of each tube 2 will abut the upper and lower foils 3, 4 respectively, or be placed adjacent the upper and lower foils 3, 4. In some embodiments there is no tube in one of the through openings 10 of the magazine 1. Often the through opening 10 having no tube is a central through opening 10. Such a through opening 10 having no tube may be used for delivery of a fluid. The tubes 2 are filled with an additive, such as milk powder. Further, an upper protective cover 8 and a lower protective cover 9 are arranged at opposite ends of the magazine 1. Normally the additive is filled into the tubes 2 with the tubes 2 in place in the magazine 1.

The activation part 5 has a number of push buttons 6. The function of the activation part 5 and the push buttons 6 will be discussed further below. A protective cover 30 is placed on the activation part 5, covering the push buttons 6. A person skilled in the art realizes that the number of tubes 2 received inside the magazine 1 may vary, depending on the specific intended use and the size of the appropriate doses.

The tubes 2 and corresponding through openings 10 of the magazine 1 are shown having a circular cross section. However, a person skilled in the art realises that the tubes and corresponding through openings may have other cross section forms, such as oval, honeycomb or other polygonal forms. Also the magazine 1 may have other forms than cylindrical.

The magazine 1 is in one embodiment made of a plastic material with a sealing material placed on the outer surface of the magazine 1 and which sealing material connects to the upper and lower foils 3, 4. The sealing material may be a foil of plastic material or metallic material, such as aluminium. In another embodiment the magazine 1 has a sealing material inmoulded in the outer wall. In a further embodiment each tube 2 is metallised to give the sealing effect. In still a further embodiment the magazine 1 is made of cardboard with a sealing material on the inside.

The activation part 5 has the form of a ring. The push buttons 6 are received in through openings of the activation part 5 and project from an upper edge of the activation part 5, in non-activated positions. The push buttons 6 have a disc 21 at an upper end. The outer diameter of the disc 21 exceeds the inner diameter of the through openings of the activation part 5 receiving the push buttons 6. In an activated position for each push button 6 the disc 21 of the push button 6 will abut the upper surface of the activation part 5. Each push button 6 is to act on a single tube 2 in the magazine 1. Thus, the push buttons 6 are given positions corresponding to the position of the tubes 2 in the magazine 1. Each push button 6 has a pointed lower end 15. In a non activated position the pointed lower end 15 of the push button 6 abuts or is placed adjacent the upper foil 3. The activation part 5 is pressed down on one end of the magazine 1 and is held in placed by means of co-operating ridges 11, 13 on the magazine 1 and activation part 5, respectively. In another embodiment the activation part is assembled to the magazine by means of co-operating threads.

A support 7 is placed in a central position of the activation part 5. Said support 7 is to support the protective cover 30, in order to hinder unwanted activation of any push button 6 when the protective cover 30 is in place. The support 7 has the form of a tube in some embodiments, for delivery of a fluid. Such a support 7, having the form of a tube, is placed in a position over a through opening 10 of the magazine 1 having no tube. In some embodiments there is no support, wherein a pipe for delivery of fluid can be inserted directly into a through opening 10 of the magazine 1 having no tube.

It is possible to reuse the activation part 5. It will then be removed from the magazine 1 when all tubes 2 have been emptied and then placed on a new magazine 1 having filled tubes 2. The push buttons 6 are returned to their non-activated positions, when hitting the upper foil 3.

The upper and lower foils 3, 4 are adhered to the ends of the magazine 1, in that the foils 3, 4 adhere to a solid part 16 of the magazine 1 between the openings 10 of the magazine 1. The foils 3, 4 are adhered to the ends of the magazine 1 by means of glue or welding. As stated above the ends of the tubes 2 will abut the upper and lower foils 3, 4, respectively, or be placed adjacent the upper and lower foils 3, 4.

In one embodiment the magazine 1 is mounted to a bottle 19 by means of an adapter 17. The bottle 19 may be a feeding bottle. The adapter 17 is fastened to the magazine 1 by means of inner protruding parts of the adapter 17 received in grooves 12 at the lower end of the magazine 1. A person skilled in the art realises that the adapter 17 and the magazine 1 may be assembled to each other in other ways than as indicated above. It may for instance be by means of protruding parts of the magazine 1 received in grooves of the adapter 17 or by co-operating threads of respective part. In the shown embodiment the adapter 17 is mounted to the bottle 19 by means of co-operating threads 18, 20 of the adapter 17 and bottle 19, respectively. The threads 20 of the bottle 19 are the threads normally used for receiving a cap of the bottle 19.

Figure 5:
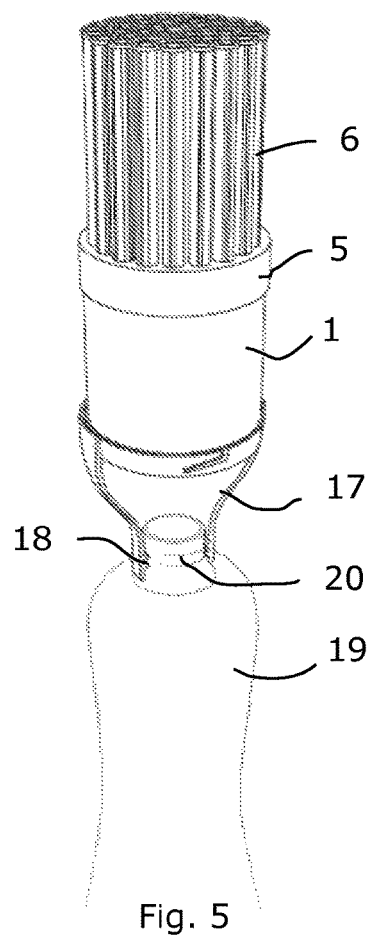
FIG. 5 is a partly cut perspective view of an adapter mounted to the multiple dosing device of FIGS. 3 and 4.

In use the magazine 1 is placed to be able to release powder from one or more of the tubes 2 to a suitable container. If for instance an adapter as indicated in FIG. 5 is used, the lower protective cover 9 of the magazine 1 is removed before the magazine 1 is mounted to the adapter 17. The adapter 17 is mounted to the bottle 19 either before the magazine 1 is mounted to the adapter 17 or with the magazine 1 already mounted to the adapter 17. The bottle 19 is furnished with a suitable fluid for receiving powder form the magazine 1. Said fluid is often water. After mounting of the adapter 17 and the magazine 1 to the bottle 19 the upper protective cover 8 is removed. Thereafter, one or more of the protruding push buttons 6 are pressed down, whereby the pointed lower end 15 of each push button 6 will go through the upper foil 3. In one embodiment the upper foil 3 is weakened in the area of the pointed lower end 15 to facilitate penetration of the upper foil 3. The weakness may be given by grooves that not fully go through the upper foil 3. The grooves may be placed in the form of a part of a circle, wherein no grooves are placed in the part of the circle opposite the part to receive the pointed lower end 15 of the corresponding push button 6. The penetration is also facilitated by means of the upper foil 3 being adhered to the solid part 16 of the magazine 1, as stated above. By means of the weaknesses in form of parts of circles and the adherence to the solid part 16 of the magazine, the risk that any part of the upper foil 3 will be torn away and follow the released powder into the fluid of the bottle 19 is minimized. In a further embodiment the upper foil 3 is pre-tensioned in such a way that it will automatically withdraw from the formed opening.

As a push button 6 is pressed downwards penetrating the upper foil 3, it will push the tube 2 placed below it downwards. Thereby the lower pointed end 14 of said tube will penetrate the lower foil 4. In the same way as discussed above the lower foil 4 may have grooves placed in the form of a part of a circle giving a weakness to facilitate penetration. In the same way as for the upper foil 3, the partly circular weaknesses of the lower foil 4 and the adherence of it to the solid part 16 of the magazine 1, or pre-tension of the lower foil 4 will minimize the risk that parts of the lower foil 4 will be torn away and risk ending up in the fluid of the bottle 19. When the lower pointed end 14 of a tube 2 has penetrated the lower foil 4, the powder inside said tube 2 will be released and go down into the bottle 19 via the adapter 17.

In order to hinder that the tube 2 is ejected from the magazine 1, a stop ring 22 is placed on the outer surface of the tube 2, a distance above the lower end corresponding with the desired maximal movement for the tube 2. Said stop ring 22 is to abut an inner edge 23 at the lower end of the through opening 10 to stop the movement of the tube 2. Thus, the stop ring 22 and the lower edge 23 co-operate to define the activated position of the tube 2. The stop ring 22 may be a separate part fixed to the tube 2 or may be formed as a bead on the tube 2.

Figure 3:
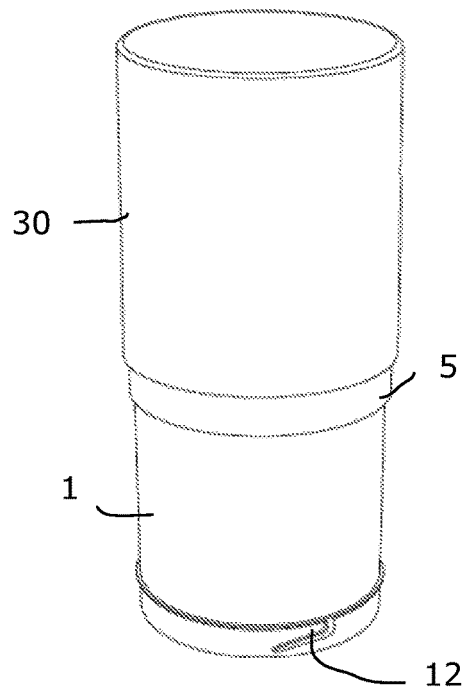
FIG. 3 is a perspective view of a multiple dosing device, comprising the magazine of FIGS. 1 and 2.
Figure 4:
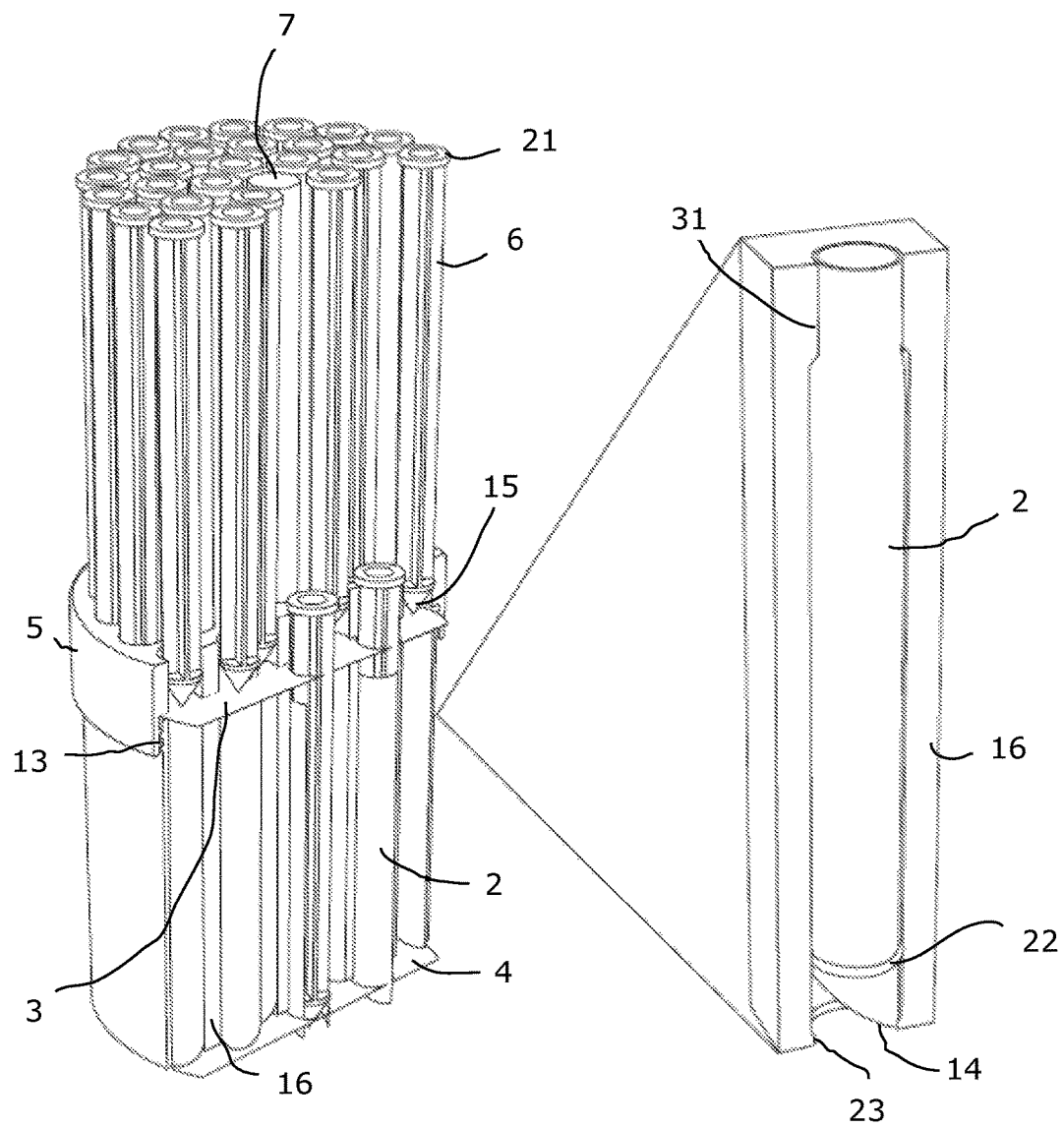
FIG. 4 is a cut perspective view of the multiple dosing device of FIG. 3, including an enlarged part.

In the embodiment of FIGS. 3 to 5 the push buttons 6 will be pressed all the way through respective tube 2 in order to positively eject the additive from the tube 2. As indicated in the enlargement of FIG. 4, the upper end of each through opening 10 has a smaller diameter. In the starting, non-activated position the upper end of each tube 2 is pressed into the upper end of the opening 10. Each push button 6 has an outer diameter slightly larger than the inner diameter of the upper end of the tube 2, when said upper end is placed in the part 31 of the opening 10 having a smaller diameter. When the press button 6 is activated it will therefore press the tube 2 downwards in the through opening 10. When the upper end of the tube has left the part 31 of the opening 10 having smaller diameter, the tube 2 will flex outwards. The distance for the part 31 of the through opening 2 having smaller diameter corresponds with the distance between the stop ring 22 and the lower edge of the tube 2. The outer diameter of each push button 6 is somewhat smaller than the inner diameter of the tube 2, when the tube 2 has left the part 31 of the opening 10 having smaller diameter. By means of this arrangement the push button 6 will press the tube 2 downwards until the stop ring 22 hits the edge 23 at the lower end of the opening 10 at the same time as the upper end of the tube 2 flex outwards as it leaves the part 31 of the opening 10 having smaller diameter. The push button 6 will then continue its movement downwards inside the tube 2, which tube 2 now is at a standstill.

A person skilled in the art realises that the arrangement between the push 6 buttons and respective tubes 2 to first push down the tube 2 and then let the push button 6 continue inside the tube 2 may be accomplished in different ways. In an alternative embodiment the push button will look somewhat like a syringe, with a lower part having an outer diameter larger than the outer diameter of the tube, for pressing the tube downwards until the stop ring of the tube hits the lower edge of the through opening. A second part of the "syringe" is arranged axially moveable in relation to the first part and will go down into the tube. In this case there is no need for a smaller diameter of the through opening at the upper end. In a further alternative embodiment the tube 2 has the same inner diameter throughout its entire length. A membrane is thereby placed at the upper end of the tube 2. The force needed to break said membrane is larger than the force needed to break the lower foil 4. When the push button 6 is activated it will first press on the membrane, without breaking it, pushing the tube 2 downwards inside the magazine 1, whereby the pointed lower end 15 of the push button 6 will break the lower foil 4. When the movement of the tube 2 downwards is stopped by means of the stop ring 22, the pointed lower end 15 of the push button 6 will break the membrane and continue its movement downwards inside the tube 2.

If more than one dose of an additive is to be released the number of push buttons 6 corresponding with the desired dose is pressed down.

The push buttons 6 stay in the lowered positions after the powder in corresponding tubes 2 has been released. It is therefore easy to establish how many doses are left in the magazine 1. One only counts the number of push buttons 6 in non-activated positions.

Figure 6:
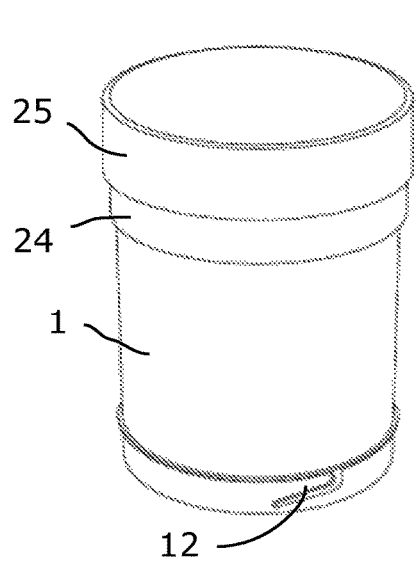
FIGS. 6 and 7 are perspective views of an alternative multiple dosing device.
Figure 7:
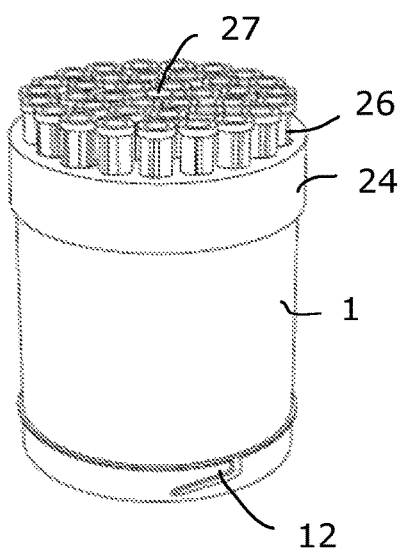

In the embodiment of FIGS. 6 and 7, the multiple dosing device comprises a magazine 1 to which an activation part 24 in the form of a ring is mounted. The activation part 24 has push buttons 26 and a central support 27 for a protective cover 25 of the activation part 24. The axial length of each push button 26 of the activation part 24 is relatively short compared to the previously described embodiment. In the same way as for the previously described activation part 5, the central support 27 has the form of a tube in some embodiments, for delivery of a fluid. Such a support 27, having the form of a tube, is placed in a position over a through opening 10 of the magazine 1 having no tube. In some embodiments there is no support, wherein a pipe for delivery of fluid can be inserted directly into a through opening 10 of the magazine having no tube.

The embodiment of FIGS. 6 and 7 is intended for an additive which will be released by means of gravitation. Depending on the consistency of the additive, such as grain size and greasiness, and the characteristics of the tubes 2, such as inner diameter and cross section form, the gravitation may not suffice to release the additive from the tubes 2. The previously described embodiment, having relatively long push buttons 6 is intended for use with such additives.

Also in the embodiment of FIGS. 6 and 7 the push buttons 26 have pointed lower ends, to go through the upper foil 3 of the magazine 1. Thus, when a push button 26 is activated it will go through the upper foil 3 and press the tube 2, placed below it through the lower foil 4 of the magazine 1. The tube 2 will be pressed downwards until the stop ring 22 hits the edge 23 of the opening 10. The additive inside the tube 2 will then be released through gravitation. The push buttons 26 of this embodiment are not intended to go all the way through corresponding tubes 2.

For magazines 1 having a central through opening having no tube or where a support 7, 27 in the form of a tube is used, a hot or cold fluid may be delivered via said opening or support 7, 27 in the form of a tube into the bottle 19 after or before the additive is released. A pipe is then inserted in the through opening, penetrating the upper and lower foils 3, 4. The fluid is then furnished to the bottle 19 via said pipe. It is also possible to break the upper and lower foils 3, 4 at the opposite ends of the through opening by means of an appropriate tool and then lead the fluid down into the bottle 19 via the through opening. Hot or cold fluid can be provided via such a central through opening having no tube for instance in connection with baby formula milk powder, coffee, tea or any other additive.

When the additive has been released the adapter 17 and multiple dosing device is removed from the bottle 19. The adapter 17 may be reused.

Figure 8:
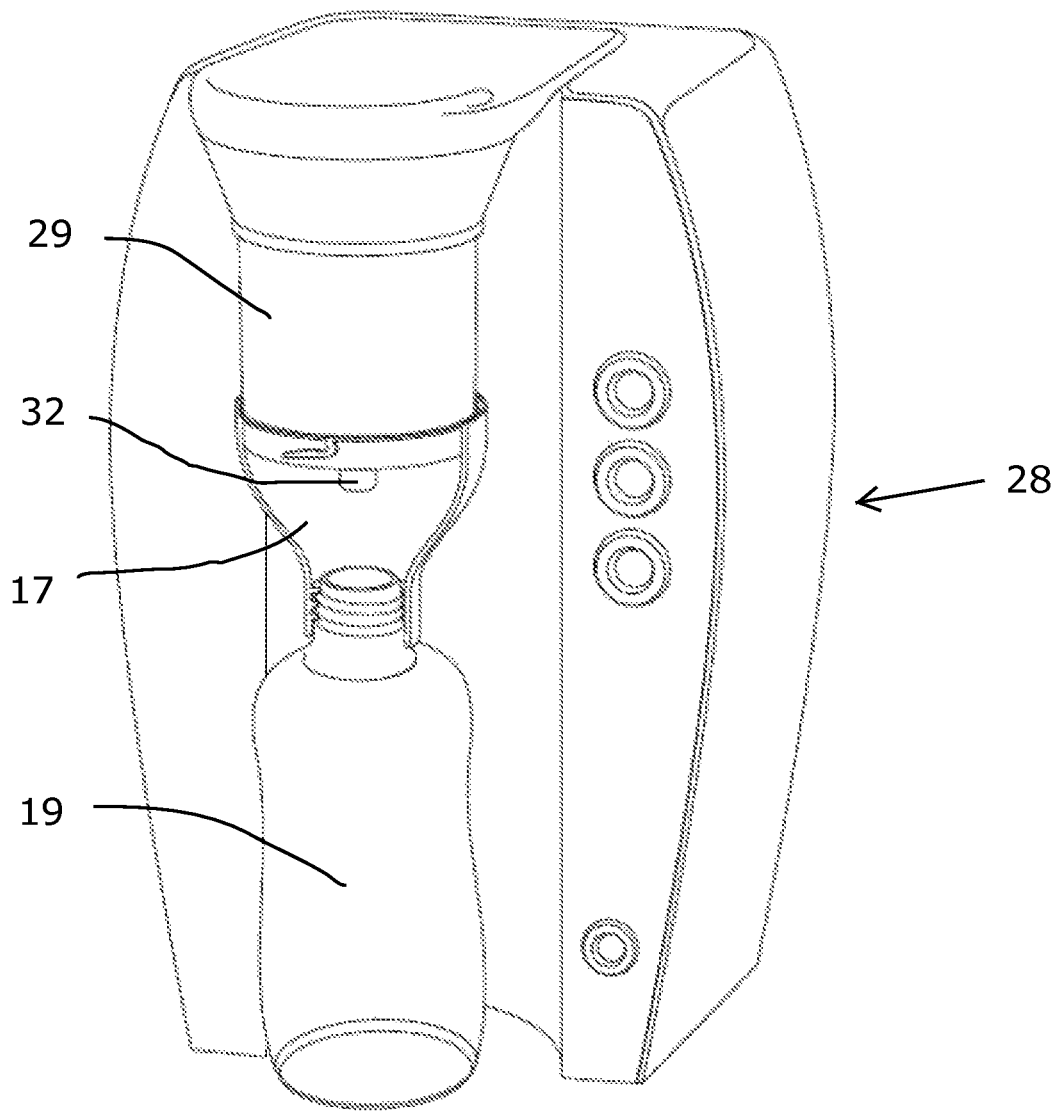
FIG. 8 is a perspective view, partly cut, of a coffee making machine using a multiple dosing device.

A magazine of a multiple dosing device according to the present invention may be used for different types of additives, as indicated above. In FIG. 8 a coffee making machine 28 is indicated. The coffee making machine 28 is only shown as one example of an automatic brewer. A magazine 29, corresponding with previously described magazines, is placed in the coffee making machine 28. In this case the automatic brewer as such forms the activation part of the multiple dosing device. Thus the automatic brewer will have means to break the upper foil 3 of the magazine 1, and to push the tubes 2 downwards to break the lower foil 4 of the magazine. The means to break the upper foil 3 and to push the tubes 2 downwards, are either controlled by the automatic brewer or are controlled manually by the user. In a way corresponding to the embodiment of FIG. 5, an adapter 17 is placed between the lower end of the magazine 1 and an upper end of a bottle 19. The fluid, such as hot water, may be distributed directly to the bottle 19 by means of a pipe 32 of the brewer 28. The pipe 32 is received in a central through opening 10 of the magazine 1 having no tube. The upper and lower foils 3, 4 of the magazine 1 are broken by means of the pipe 32. It is also possible to break the upper and lower foils 3, 4 at the opposite ends of the through opening 10 by means of an appropriate tool and then lead the fluid down into the bottle 19 via the through opening 10. The additive to the fluid is delivered from one or more tubes 2 of the magazine 1, either before or after the fluid or at the same time as the fluid. The order of deliverance of the fluid and the additive depends on the type of additive and the fluid. A person skilled in the art realises that this kind of brewer may be used for other additives than coffee or tea.

In automatic brewers water may be feed directly through a tube 2. The upper foil 3 of the magazine is thereby broken by the brewer, either by a pipe for delivery of the water or by a separate pointed part, such as one or more needles. The motion for the tube 2 will then be accomplished by the pressure of the water. By means of said pressure of water, the pointed lower end 14 of the tube 2 will break the lower foil 4. In the bottom of the tube 2 a sieve may be placed in order to hinder an additive, such as coffee, to be released from the tube 2. The movement of the tube 2 will be stopped by the co-operation between the stop ring 22 and the edge 23 of the opening 10. The tubes 2 having a sieve at the lower end are mainly intended for coffee or tea.

The activation part 5 and the adapter 17 may be reused. It is therefore enough for a consumer to purchase a magazine 1 with filled tubes 2 when a previous magazine 1 has been emptied.

The magazine 1 together with a mounted activation part 5, 24 may be fixed to a stand, in which case it may suffice to hold a bottle, such as a feeding bottle, directly under the magazine 1. A person skilled in the art realises that such a stand may have many different designs. The magazine 1 and activation part 5, 24 is mounted to the stand in any suitable way such as by screws or snap fastenings.

The invention claimed is:

1. A multiple dosing device for releasing one or more doses of an additive, comprising:
    a magazine having a number of through openings each receiving a tube, wherein the tubes are open at both ends and each contains a dose of the additive, the through openings and tubes extending axially between two opposite ends of the magazine, the tubes are arranged and moveable in an axial direction inside respective through openings;
    an upper foil and a lower foil placed and adhered to the opposite ends of the magazine, wherein the ends of the tubes are placed abutting or adjacent the upper and lower foils, respectively; and
    an activation part, wherein each of the tubes has a pointed lower end for penetrating the lower foil, the activation part has push buttons, the push buttons are placed for controlling the axial position of one of the tubes each, and each push button has a pointed lower end for penetrating the upper foil, and
    wherein each push button is arranged to move one of the tubes of the magazine from a non-activated position to an activated position releasing the dose of additive of the one of the tubes and each push button continues its movement inside the corresponding one of the tubes.

2. The device of claim 1, wherein each of the tubes has an outer stop ring co-operating with an edge at the lower end of corresponding through opening to define the activated position of the tube.

3. The device of claim 2, wherein the push buttons are arranged in through openings of the activation part, wherein the push buttons protrude upwards from the activation part in a non-activated position and wherein the pointed lower end of each push button abuts or is placed adjacent the upper foil when the activation part is mounted to the magazine and when the push button is in the non-activated position.

4. The device of claim 2, wherein the upper end of each of the through openings has a smaller diameter than the rest of the through opening, wherein the upper end of each of the tubes is pressed into said upper end of the through openings in the non-activated position and wherein the upper end of the tubes will be pressed out from the upper end of the through openings in the activated position by means of the push button, whereby the upper end of the tubes will flex outwards.

5. The device of claim 1, wherein the upper and lower foils have weaknesses for facilitating penetration by the push buttons and tubes respectively, and wherein the upper and lower foils are adhered to solid parts of the magazine at respective opposite ends.

6. The device of claim 1, wherein the magazine has an adapter that is connected by co-operating grooves and protruding parts, and wherein the adapter is to be mounted to a container.

7. The device of claim 1, wherein the magazine and an adapter are connected to each other by co-operating grooves and protruding parts.

8. The device of claim 1, wherein the activation part is held at the magazine by co-operating ridges of the activation part and magazine, respectively.

9. The device of claim 1, wherein the device is used for baby formula milk powder.

10. The device of claim 1, wherein the activation part is formed of an automatic brewer.

11. The device of claim 1, wherein a further through opening is arranged in the magazine for delivery of a fluid.

12. The device of claim 11, wherein a pipe is placed inside the further through opening for delivery of the fluid.

13. The device of claim 10, wherein one or more of the tubes has a sieve at a lower end.

14. A magazine of a multiple dosing device, comprising:
    a number of through openings each receiving a tube, wherein the tubes are open at both ends and filled with a dose of an additive, the through openings and tubes extend axially between two opposite ends of the magazine, and the tubes are arranged and moveable in an axial direction inside the respective through openings; and
    an upper foil and a lower foil placed and adhered to the opposite ends of the magazine, wherein the ends of the tubes are placed abutting or adjacent the upper and lower foils, respectively.

15. The magazine of claim 14, further comprising a further through opening that does not receive a respective one of the tubes.

16. The magazine of claim 14, wherein the magazine is made of a plastic material with a protective layer on the outer surface and, wherein the protective layer is a plastic or metallic layer.

17. The magazine of claim 14, wherein the magazine is made of a cardboard with a protective layer on the inside.

18. The magazine of claim 14, wherein each of the tubes is metallised.

19. The magazine of claim 14, further comprising an upper protective cover and a lower protective cover, which upper and lower protective covers are arranged to be removed before use of the magazine.

20. The magazine of claim 14, at least one of:
    wherein each of the tubes includes a pointed lower end for penetrating the lower foil, and
    further comprising an activation part including push buttons for controlling the position of respective ones of the tubes.

* * * * *